us005774432A

United States Patent [19]

Alon et al.

[11] Patent Number: 5,774,432
[45] Date of Patent: Jun. 30, 1998

[54] FOCUSSING SYSTEM AND METHODS FOR MULTI- TRACK OPTICAL DISK APPARATUS

[75] Inventors: Amir Alon, Sunnyvale, Calif.; Jacob Finkelstein, Kfar Saba, Israel; Itzhak Katz, Petach-Tikva, Israel; Michael Naor, Rehovot, Israel; Shlomo Shapira, Petach-Tikva, Israel

[73] Assignee: Zen Research N.V., Curacao, Netherlands Antilles

[21] Appl. No.: 842,936

[22] Filed: Apr. 25, 1997

Related U.S. Application Data

[62] Division of Ser. No. 531,764, Sep. 20, 1995, Pat. No. 5,708,634.

[51] Int. Cl.⁶ .................................................. G11B 7/095
[52] U.S. Cl. ........................................ 369/44.23; 369/112
[58] Field of Search ........................ 369/44.23–44.24, 369/44.35–44.36, 44.41–44.42, 112, 120, 44.34; 250/201.5

[56] References Cited

U.S. PATENT DOCUMENTS

| | | |
|---|---|---|
| 3,780,266 | 12/1973 | Mudsam et al. . |
| 4,486,870 | 12/1984 | Pettigrew et al. ......................... 369/32 |
| 4,536,866 | 8/1985 | Jerome et al. ........................... 369/112 |
| 4,816,665 | 3/1989 | Hsu . |
| 4,900,910 | 2/1990 | Doi . |
| 4,972,396 | 11/1990 | Rafner ....................................... 369/32 |
| 5,081,617 | 1/1992 | Gelbart .................................... 369/112 |
| 5,111,445 | 5/1992 | Psaltis et al. ............................ 369/103 |
| 5,128,919 | 7/1992 | Narahara et al. .......................... 369/97 |
| 5,394,385 | 2/1995 | Sakurada et al. ..................... 369/44.23 |
| 5,426,623 | 6/1995 | Alon et al. ................................ 369/32 |
| 5,471,454 | 11/1995 | Tani ................................. 369/44.23 X |

FOREIGN PATENT DOCUMENTS 831264  11/1975  Belgium .

OTHER PUBLICATIONS

*Compact Disk Technology*, H. Hakajima and H. Ogawa, Ohmsa Ltd (1992), Japan, translated by C. Aschmann, IOS Press, Inc., Burke, Virginia (1992), pp. 140–142.

*The Compact Disk Handbook*, K. Pohlmann, A–R Editions, Inc., Madison, Wisconsin (2d ed. 1992), pp. 111–117.

*Primary Examiner*—W. R. Young
*Attorney, Agent, or Firm*—Fish & Neave; Nicola A. Pisano

[57] ABSTRACT

Focussing system methods and apparatus are provided for apparatus capable of simultaneously reading multiple tracks of an optical disk. Astigmatism introduced by a cylindrical lens disposed adjacent to the light source, or before the focus detectors arranged at the edge of a wide-area field of illumination, is used to compute an error signal corresponding to the degree of out-of-focus, which error signal is provided to a servo-system that moves the objective lens to correct the focus. An alternative embodiment employs a pair of focus detectors and a pair of micro-lenses having different focal lengths that directs the reflected light onto the focus detectors to generate a focus correction signal. Further alternative embodiments of employing the astigmatism method of focussing are described.

15 Claims, 7 Drawing Sheets

FOCUSSING SYSTEM AND METHODS FOR MULTI- TRACK OPTICAL DISK APPARATUS

This is a division of application Ser. No. 08/531,764, filed Sep. 20. 1995, now U.S. Pat. No. 5,708,634.

FIELD OF THE INVENTION

The present invention relates generally to retrieving information from an optical disk by simultaneously reading multiple adjacent data tracks, and more particularly to methods and apparatus for focussing an image obtained from the multiple adjacent data tracks onto an image detector.

BACKGROUND OF THE INVENTION

The use of optical disks for storing information has become popular in recent years, with a number of products becoming commercially available in a compact-disk (CD), optical disk format. More recent developments include the use of CD format for data storage for personal computer systems, which may be either read-only CD-ROMs or recordable CDs.

These optical disk products bounce light emitted from a semiconductor laser diode off an inhomogeneous reflective surface of the optical disk. The reflected light is then directed to an image detector, which outputs a signal that is processed to recover the stored digital data. A single speed CD drive rotates the disk, depending upon the portion of the disk being read, at from 200 rpm (at the outermost data track) to about 450 rpm (at the innermost track data), thus providing a constant linear velocity as the data is read off the disk.

The increased availability of CD-ROM products, coupled with the availability of increasingly faster microprocessors, has created the need for ever faster optical disk drives. As a result, disk drives capable of operating at multiples of a standard single speed drive are becoming available, for example, 2×, 4× and even 6× drives. Thus, for a 6× (six times single speed) disk drive, the disk is rotated at speeds up to 2700 rpm when reading the innermost data track. The ability to achieve even greater speeds may soon be limited by the ability of such technology to continue to provide low-cost, easily manufacturable systems, since the use of greater disk rotational speeds will require more sophisticated, higher tolerance, and thus more expensive, designs than employed in previously known arrangements.

An alternative to simply increasing the disk rotational speed is to read multiple data tracks simultaneously, as described in commonly assigned U.S. Pat. No. 5,426,623, the entirety of which is incorporated herein by reference. In accordance with the methods and apparatus provided therein, for example, ten adjacent data tracks may be read simultaneously. Thus, even if the disk is rotated at only twice standard speed (i.e., a 2× drive is used), the capability to read multiple tracks provides the equivalent of a 20× drive—more than a factor of three faster than previously known disk drives.

Implementing simultaneous multiple track reading capability for optical disks presents new problems, however, relating to tasks such as focussing. The focussing systems generally used in optical disk systems involve measuring certain parameters of the light spot formed by the illumination beam reflected from the optical disk. The light spot is typically very small, and has a diameter equal to the width of one track (i.e., 1.6 microns). Two such previously known methods are described, for example, at pages 140–142 of H. Nakajima and H. Ogawa, *Compact Disc Technology*, (translated by C. Aschmann), published by. Ohmsha, Ltd., Japan (1992), and at pages 111–117 of K. Pohlmann, *The Compact Disk Handbook,* (2nd ed. 1992), published by A-R Editions, Inc., Madison, Wis., which are incorporated herein by reference.

In a first method, known as the Foucault method, a special bi-prism and bi-cell detector are used for measuring the position of the light spot. In a second method, known as the astigmatism method, a combination of a cylindrical lens and a quadrant detector are used to measure the degree of ellipticity of the light spot. A focus error signal formed from the sum of the outputs of the bi-cells or quadrant detector is supplied to a servo-system that moves the lens to correct the focus. These focussing systems depend in part upon the very small size of the light beam reflected from the disk, so that passing through the bi-prism or cylindrical lens does not degrade the resolution of the system.

Neither of the previously known focussing methods can be used with the wide-area illumination employed in multiple track reading optical disk systems. In systems for simultaneously reading multiple tracks, the disk is illuminated by a light beam having a large diameter, and the resolution of the system is determined by the imaging optical system and by the high resolution imaging sensor. Passing the light beam created by the wide-area illumination through a bi-prism, as in the Foucault method, may cause degradation of the image. And because the light spot reflected from the wide-area illumination has a large diameter, the use of the previously known astigmatism method may require the use of a costly high power lens to focus the light to a conventional quadrant detector.

In view of the foregoing, it would be desirable to provide focussing methods and apparatus that permit focussing using a wide-area field of illumination employed in apparatus for simultaneously reading multiple tracks of an optical disk.

It would also be desirable to provide focussing methods and apparatus that permit focussing using a wide-area field of illumination employed in apparatus capable of simultaneously reading multiple tracks of an optical disk, without degradation of the image resolution.

It further would be desirable to provide focussing methods and techniques that permit focussing using a wide-area field of illumination employed in apparatus for simultaneously reading multiple tracks of an optical disk, without the use of high cost optical components.

SUMMARY OF THE INVENTION

In view of the foregoing, it is an object of this invention to provide focussing methods and apparatus that permit focussing using a wide-area field of illumination employed in apparatus capable of simultaneously reading multiple tracks of an optical disk, as described, for example, in the above-incorporated U.S. patent.

It is also an object of the present invention to provide focussing methods and techniques that permit focussing using a wide-area field of illumination employed in apparatus capable of simultaneously reading multiple tracks of an optical disk, without degradation of the image resolution.

It is a further object of this invention to provide focussing methods and techniques that permit focussing using a wide-area field of illumination employed in apparatus for simultaneously reading multiple tracks of an optical disk, without the use of high cost optical components.

These and other objects of the invention are accomplished in accordance with the principles of the invention by providing focussing systems and methods that permit focussing using a wide-area field of illumination employed in apparatus capable of simultaneously reading multiple data tracks.

In accordance with a first embodiment of the invention, a number of focus detectors are arranged around a periphery of a centrally-positioned data image detector, so that the focus detectors are located at the edge of the wide-area field of illumination used for simultaneously imaging multiple data tracks. In this first embodiment, astigmatism introduced by a cylindrical lens disposed located preferably in front of the light source, or alternatively, in the path of the reflected light directed to the focussing and data image detectors from the optical disk, is used to compute the degree of out-of-focus. Previously known servo-systems may then be used to move the objective lens to correct the focus.

In a second embodiment of the invention, a pair of focus detectors are arranged adjacent to a data image detector and within the wide-area field of illumination returned from the objective (i.e., that is used for simultaneously imaging multiple data tracks). In this second embodiment, a pair of micro-lenses having different focal lengths is disposed in the path of the reflected light directed to the data image detector, and direct the light onto the pair of focus detectors. Signals obtained from the focus detectors are then processed to obtain maxima and minima corresponding to the present or absence of tracks, with the objective being driven to equilibrate the modulation in the processed signals provided by the two focus detectors.

Further alternative embodiments are provided that adapt the astigmatism method of focussing for use in apparatus capable of simultaneously reading multiple data tracks of an optical disk.

Other features of the invention, its nature and various advantages will be more apparent from the accompanying drawings and the following detailed description of the preferred embodiments.

DETAILED DESCRIPTION OF THE PREFERRED EMBODIMENTS

The present invention provides focussing methods and apparatus for use in apparatus capable of simultaneously reading multiple data tracks from an optical disk. In a first embodiment, a variation of the well known astigmatism method of focussing is described. Alternatively, in a second embodiment, the apparatus includes micro-lenses having different focal lengths and associated focus detectors, and means for processing the signals generated by the focus detectors to drive the focus to a state in which modulation caused by the presence or absence of tracks is equalized between the focus detectors. Further alternative embodiments are also provided that enable previously known optical and electronic devices to be used in combination with a multiple track reading apparatus.

Figure 1:
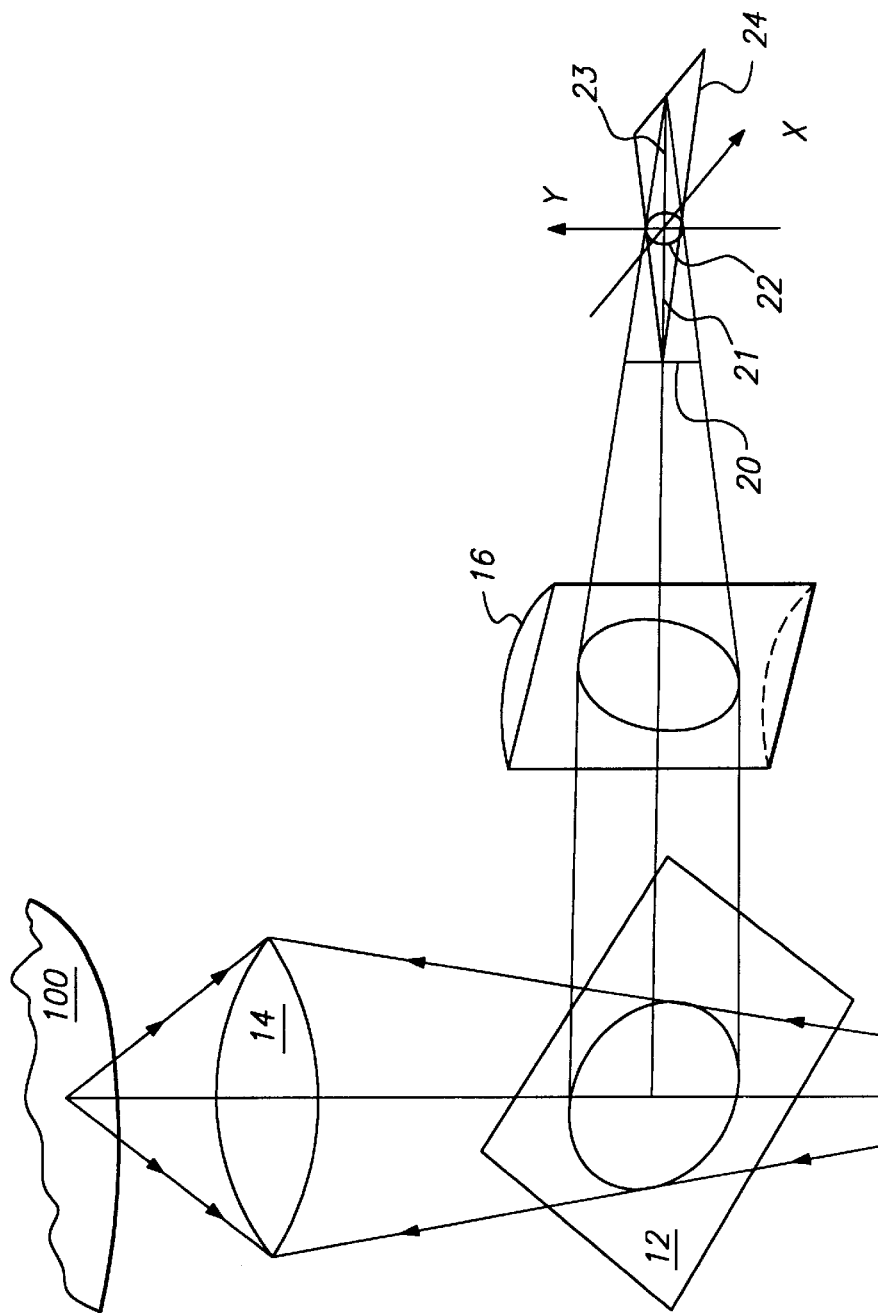
FIG. 1 is a perspective view, not to scale, of a focussing system employing the astigmatism method as implemented in a previously known optical disk system.
Figure 2:
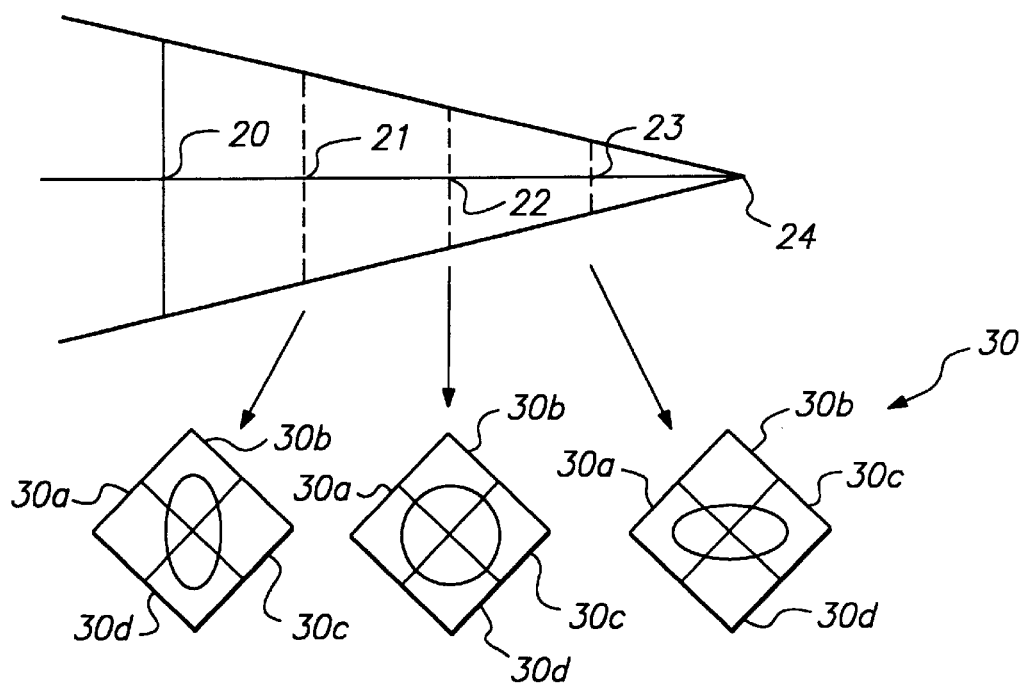
FIG. 2 is a detailed illustrative view of the light focussed by the cylindrical lens of FIG. 1 as it would appear on a previously known four quadrant focus detector located at various distances from the cylindrical lens.

Referring now to FIGS. 1 and 2, the astigmatism method as implemented in previously known optical disk reading systems is described. In FIG. 1, light from light source 10 (not shown), typically a semiconductor laser diode, is directed through beam splitter (half-mirror) 12, through objective 14 and onto a surface of an optical disk 100. Light reflected from the optical disk returns to objective 14 and is reflected by beam splitter 12 to cylindrical lens 16.

In accordance with well known principles, the addition of cylindrical lens 16 in the optical path of light reflected from an optical disk adds an astigmatism aberration to the optical system. As a result, light emerging from cylindrical lens 16 is focussed to a single vertical line (parallel to the y-axis in FIG. 1) in an x-y plane passing through point 20, and a single horizontal line in an x-y plane passing through point 24 (parallel to the x-axis). At the midpoint of the length between points 20 and 24, point 22, the light spot is circular. This circular spot is the conjugate of the focus of the objective lens, i.e., the image is inverted top-to-bottom and left-to-right.

Between points 20 and 22, for example, point 21, as the plane approaches point 20, the vertical axis of the light spot formed by cylindrical lens 16 becomes longer, corresponding to movement of objective 14 closer to the optical disk. On the other hand, at locations between points 22 and 24, for example, at point 23, as the plane approaches point 24, the horizontal axis of the light spot becomes longer, corresponding to movement of objective 14 further away from the optical disk.

The focussing system includes a quadrant detector 30, shown in FIG. 2, which is positioned in the optical path at a position corresponding to point 22. When objective 14 is focussed, the light spot projected onto quadrant detector 30 is circular. When the objective lens is too close to optical disk 100, the light spot projected onto quadrant detector 30 becomes a vertical ellipse. When the objective lens is too far from optical disk 100, the light spot projected onto quadrant detector 30 becomes a horizontal ellipse.

Quadrant detector 30 develops a focus error signal as a function of the ellipticity of the light spot impinging upon the detector. For convenience, the four quadrants of detector 30 are labelled 30a, 30b, 30c and 30d in a clockwise manner. As described, for example, at pages 140–141 of the above-incorporated *Compact Disk Technology* text, a focus error signal (FE) is developed as the difference of the sum of the outputs of the diagonal quadrants of detector 30:

$$FE=(30a+30c)-(30b+30d) \tag{1}$$

A signal proportional to the above difference is provided to a servo-motor driving objective 14 to move the objective to a location at which the focal plane corresponding to point 22 is aligned with the plane of focus detector 30. As will be readily appreciated, when the focus is correct, the circular beam of light emanating from objective 16 will impinge on equal areas of each of quadrants 30a–30d, resulting in a zero correction signal.

Figure 3A:
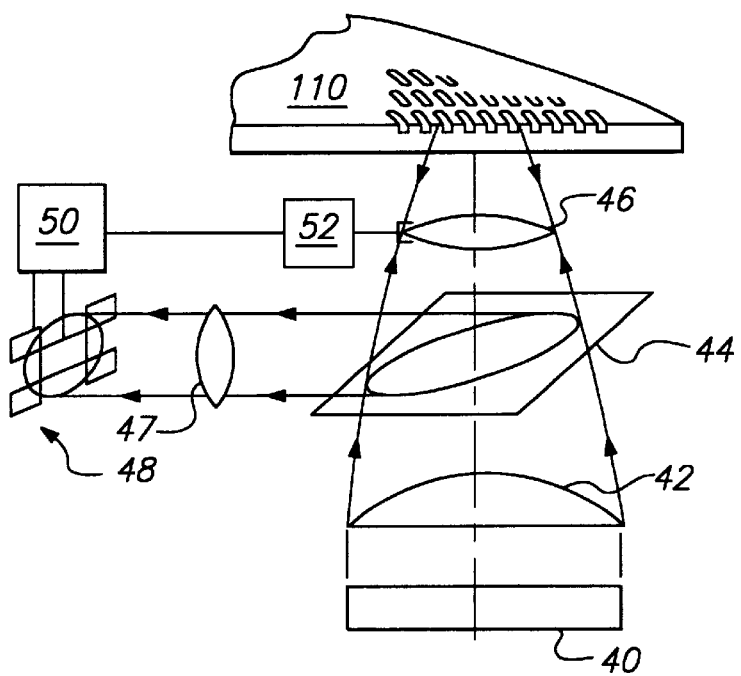
FIGS. 3A and 3B are, respectively, an elevational view, not to scale, showing a focussing system constructed in accordance with the principles of the present invention, and an elevational view illustrating operation of the focussing system of FIG. 3A.
Figure 3B:
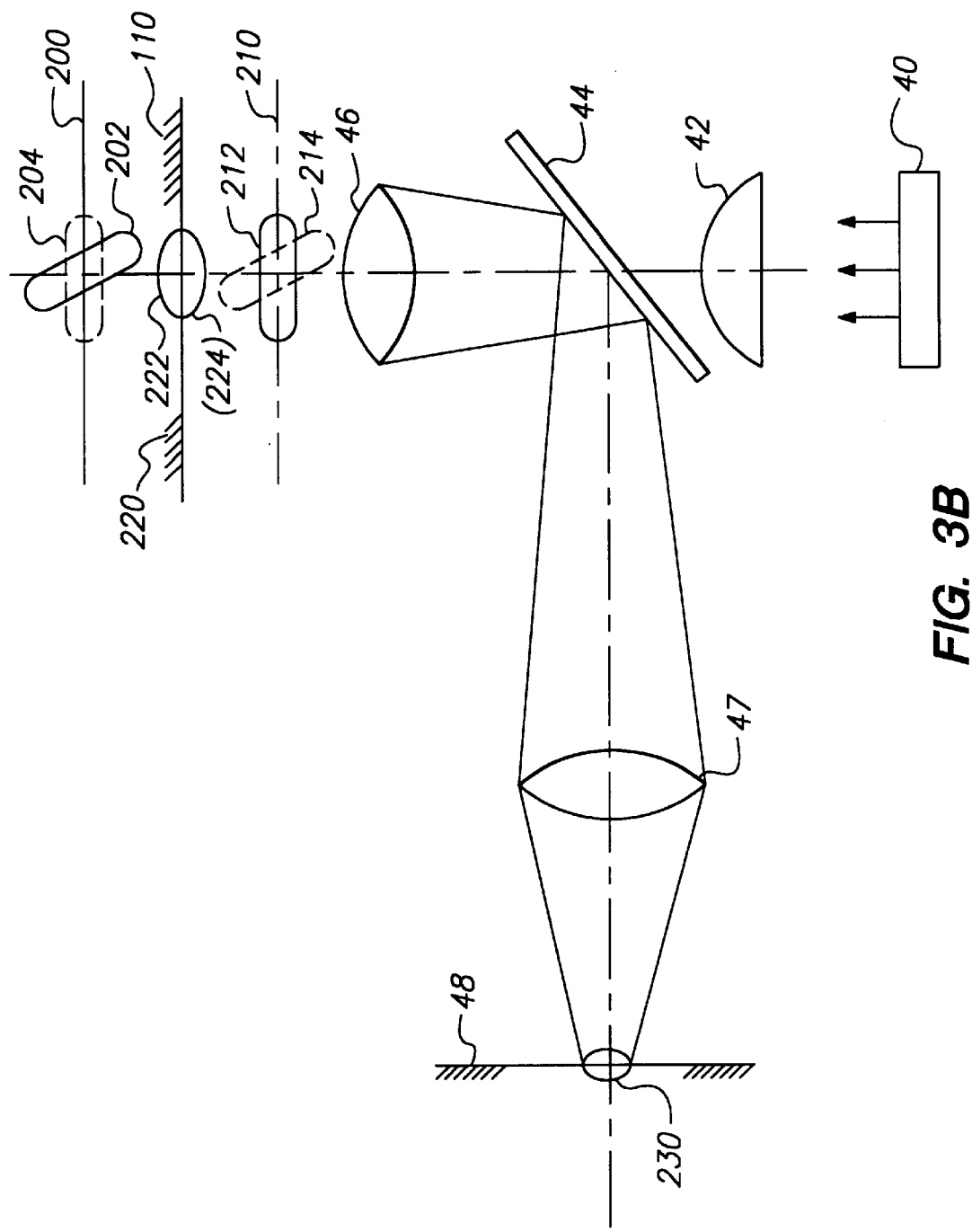

Referring now to FIGS. 3A and 3B, an adaptation of the astigmatism method is described for use with apparatus capable of simultaneously reading multiple data tracks from an optical disk. In this adaptation of the astigmatism focussing method, cylindrical lens 42 introduces an astigmatism aberration in the optical path near the light source, such that the image of the light source is aberrated rather than the image of the optical disk.

In the embodiment of FIG. 3, light emitted from source 40 of laser light, obtained as described, for example, in the above-incorporated U.S. patent, passes through cylindrical lens 42, beam splitter 44 and objective 46, and impinges on multiple tracks of optical disk 110. The wide-area beam of light reflected from optical disk 110 again passes through objective 46 and is directed by beam splitter 44 and tube lens 47 to image and focus detector array 48. Image and focus detector array 48 is coupled to controller 50, which may be a microprocessor or suitable analog circuitry, that provides a signal to servo-motor system 52.

Servo-motor 52 drives objective 46 towards and away from optical disk 110 responsive to signals generated by controller 50 and image and focus detector array 48. Controller 50 and servo-motor system 52 may comprise components of previously known optical disk reading systems, as described, for example, at pages 149 to 177 of the foregoing *Compact Disc Technology* text, which is incorporated herein by reference.

Referring now to FIG. 3B, the astigmatic image of the light source created by cylindrical lens 42 is described. The image of the light source projected by objective 46 onto the reflective layer of optical disk 110 is astigmatic, having orthogonal elliptical focal planes 200 and 210 on either side of a central in-focus plane 220 (that coincides with the reflective layer 110 of the optical disk when the system is focussed).

For example, the image of the light source forms elliptical spots 202 and 212 with circular spot 222 at a point mid-way between them. The reflective layer of optical disk 110 acts as a mirror that re-images the astigmatic image of the light source in planes 200 and 210 to their complementary planes, thus resulting in light spots 204, 214 and 224. Objective 46 again re-images the light source through beam splitter 44 and tube lens 47 to a produce corresponding image spot 230 on detector 48.

The circular image 230 projected onto detector 48 is the conjugate of circular spot 224, which in turn is the conjugate of circular spot 222. When objective 46 is correctly focussed on optical disk 110, circular spot 224 is imaged to circular spot 230 on detector 48. When optical disk 110 is too close to the focal plane of objective 46, image spot 230 projected onto detector 48 becomes horizontally elongated. Likewise, when optical disk 110 is too far away from the focal plane of objective 46, image spot 230 becomes vertically elongated. In this manner, the state of the focus is translated into a degree of ellipticity of the wide-area illumination beam.

Figure 4A:
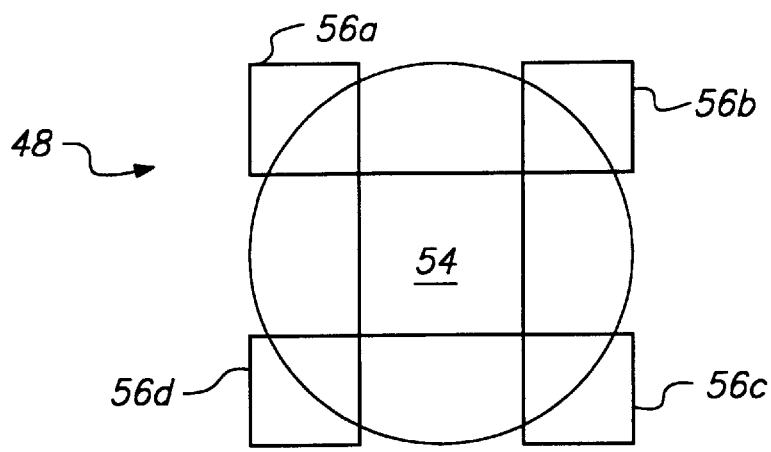
FIGS. 4A, 4B and 4C show the coverage of the wide-area field of illumination reflected from the optical disk for the system of FIG. 3 depending on the state of the focus.
Figure 4B:
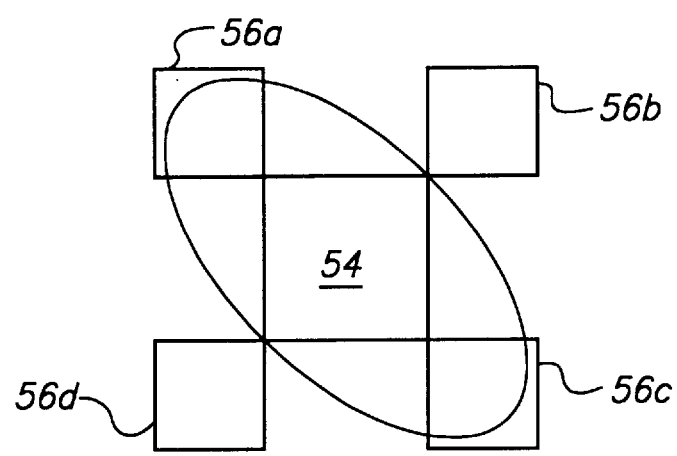
Figure 4C:
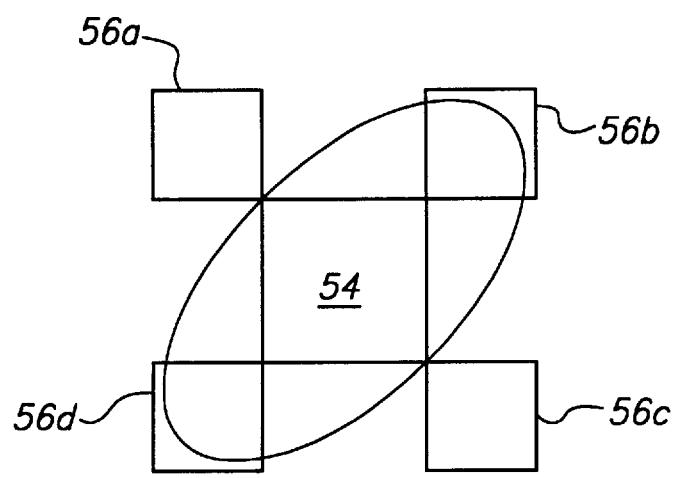

Referring now also to FIGS. 4A to 4C, operation of the focussing system of FIGS. 3A and 3B is described. As shown in FIG. 4, image and focus detector array 48 includes data image detector 54 surrounded by focus detectors 56a, 56b, 56c and 56d. Data image detector 54 preferably comprises a time-delay integration semiconductor charge-coupled device, as described in the above-incorporated U.S. patent, and generates output signals corresponding to the digital data encoded in a plurality of adjacent tracks on optical disk 110.

Focus detectors 56a–56d are located around the periphery of image detector 54 so that only a portion the focus detectors are illuminated by the beam of light emanating from objective 46 as a result of the wide-area field of illumination provided by source 40. With focus detectors 56a–56d arranged at the edge of the illumination field, the areas of each of the focus detectors illuminated will be equal when the focus is correct, as shown in FIG. 4A.

With respect to FIGS. 4B and 4C, if objective 46 is too close, the beam of light reflected from optical disk will be horizontally elongated (shown as a left-leaning ellipse in FIG. 4B), so as to produce a larger output from focus detectors 56a and 56c. On the other hand, if objective 46 is too far away from the optical disk, the beam of light reflected from optical disk will be vertically elongated (shown as a right-leaning ellipse in FIG. 4C).

Using equation (1) provided above to compute a difference between the sums of the outputs of focus detectors (56a+56c) and (56b+56d) results in an error signal from controller 50 that causes servo-motor 52 to drive objective 46 in an appropriate direction to correct the focus. Thus, by placing a cylindrical lens in front of source 40 before beam splitter 44 and employing individual focus detectors arranged on the periphery of the field of illumination, the astigmatism method of focussing can be adapted for use with apparatus capable of simultaneously reading multiple data tracks. Alternatively, cylindrical lens 42 may be placed between beam splitter 44 and image and focus detector array 48, similar to the arrangement of FIG. 1, with the focus detectors 56a–d again being arranged around the image detector.

Referring again to FIGS. 3A and 3B, during track access operation objective 46 may move up to +/−15 mm along the optical axis of the focussing system. This movement may also change the distances between cylindrical lens 42 and objective 46, and introduce misalignment between these components. Applicant has found that these changes in distance, as well as misalignment, may result in small shifts of the position of spot 230 relative to the focal plane of objective 46. These small shifts may result in a small degree of ellipticity, or a sideways shift of the circular spot, being re-imaged to the detector 48 even though the optical disk is located at the focal plane of objective 46. These small shifts, if not compensated for, may incorrectly result in generation of a focus error signal.

To account for the foregoing shift caused by relative motion between the objective and the cylindrical lens, the change in distance or displacement between objective 46 and cylindrical lens 42 may be tracked during the process of accessing data tracks on optical disk 110. A look-up table may then be consulted which provides an off-set in the correction signal that may be applied to the focus error signal.

For example, if controller 50 provides a digital signal to servo-motor 52 that controls movement of objective 46, that digital signal may also be used in a RAM or ROM-based lookup table to obtain a digital offset correction signal (OFF), which is then summed with the signals output by focus detectors 56a–56d:

$$FE=(56a+56c)-(56b+56d)+OFF \qquad (2)$$

If on the other hand, analog circuitry is employed to measure movement of the pickup head (and the objective lens), then for a well-behaved offset correction signal, an analog offset correction signal may be developed using a suitable combination of analog circuits, for example, digital to analog converters.

Figure 5:
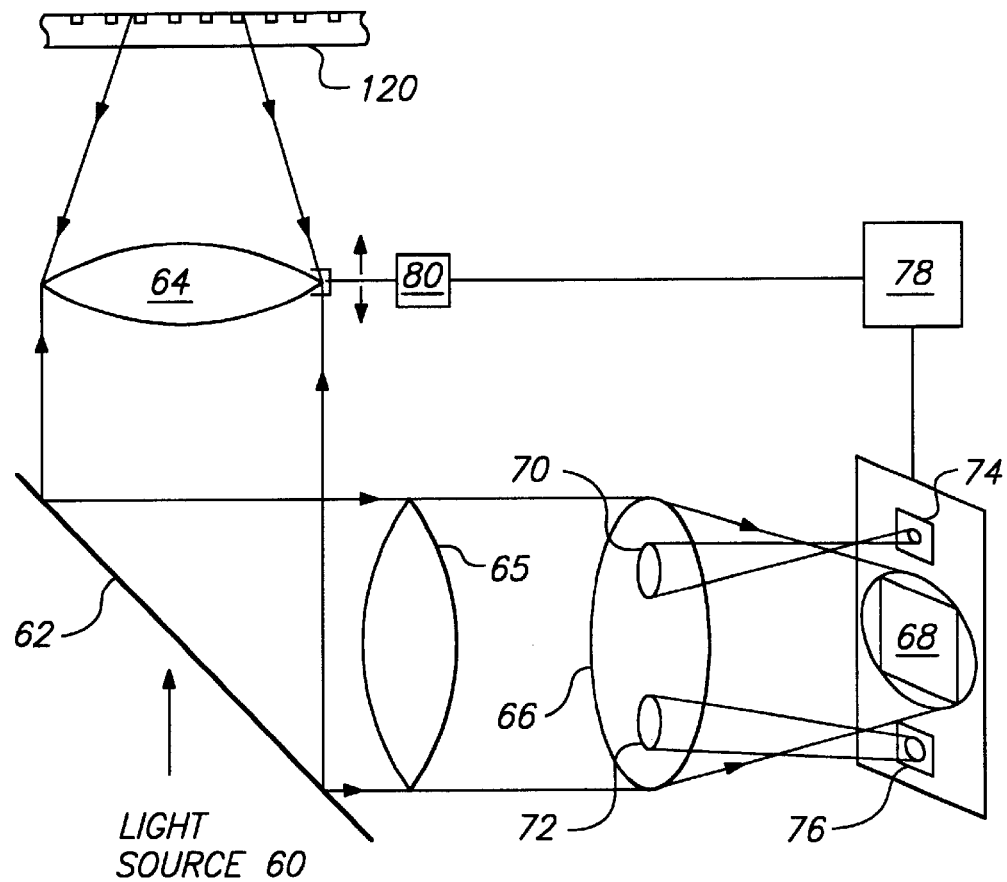
FIG. 5 is an elevational view, not to scale, showing an alternative embodiment of the focussing methods and apparatus of the present invention.
Figure 6:
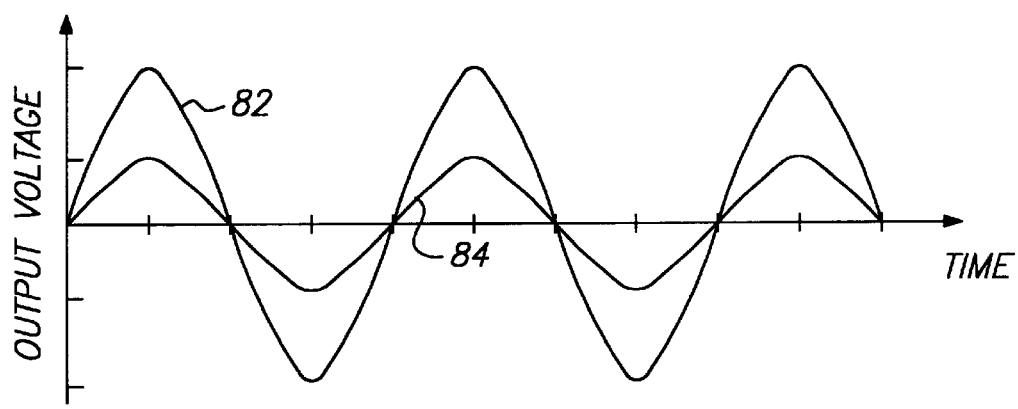
FIG. 6 is an illustrative output of the signal of the focus detectors of FIG. 5.
Figure 7:
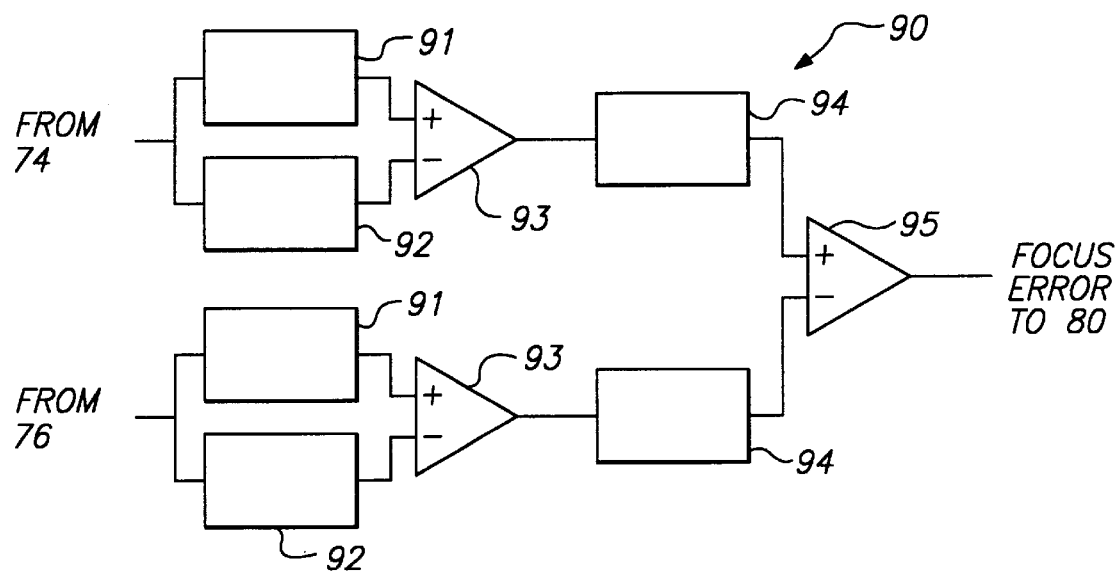
FIG. 7 is a block diagram of analog electronic circuitry suitable for implementing the focussing system of FIG. 5.

Referring now to FIGS. 5 to 7, alternative embodiments of the focussing methods and apparatus of the present invention are described. In these embodiments of the invention, light emitted from source 60 passes through beam splitter 62 and objective 64 and impinges upon optical disk 120. Light reflected from optical disk 120 passes through objective 64 and is directed by beam splitter 62 to tube lens 65. Lens 66 and micro-lenses 70 and 72 pass the light beam refracted from tube lens 65 to image detector 68 with some focus offset. Focus detectors 74 and 76 are illustratively positioned above and below image detector 68, and in the same focal plane as the image detector.

Focus detectors 74 and 76 integrate the image for predetermined regions of the optical disk tracks, and may comprise conventional charge-coupled devices. In a preferred embodiment, each of focus detectors comprises a group of CCD elements 8 pixels wide (at about 10.8 microns per pixel) by 320 microns long coupled to a shift register which outputs the pixel data. These dimensions of the focus detector pixels take into account the about 25 times magnification of the optical disk image created by the optical system.

The output shift registers of focus detectors 74 and 76 are connected to digital controller 78 via A/D converters, or are coupled to suitable analog circuitry, for example, as shown in FIG. 7. Alternatively, the outputs of the focus detectors may be used directly to determine the minima and maxima corresponding to the track locations. Digital controller 78 computes an error signal that is provided to servo-motor 80 to drive objective 64 either closer to, or further away from, optical disk 120.

As illustrated in FIG. 5, micro-lens 70 has a focal point lying in a plane nearer than the plane in which its corresponding focus detector 74 is located, while micro-lens 72 has a focal point lying in a plane behind the plane in which its corresponding focus detector 76 is located. Focus detectors 74 and 76 generate an output voltage signal corresponding to the intensity of the light impinging on their surfaces from micro-lenses 70 and 72, respectively.

Since the light intensity directed to focus detectors 74 and 76 is a function of the presence of reflective tracks and non-reflective "pits" in optical disk 120, digital controller 78 may be programmed to analyze the degree of modulation in the focus detector output signals as well as the difference between the signals from focus detectors 74 and 76. Thus, for example, digital controller 78 may analyze the output signals of focus detectors 74 and 76 to determine local maxima (corresponding to the spaces between tracks) and local minima (corresponding to the location of the tracks). The effect of this modulation of the light impinging upon focus detectors 74 and 76 is illustratively shown in FIG. 6 as sine waves 82 and 84 having different amplitudes corresponding to the outputs of focus detectors 74 and 76 for an out-of-focus condition.

Referring to FIG. 7, a block diagram of preferred analog focussing circuitry 90 for use in the focussing system of the embodiment of FIG. 5 is described. Focussing circuitry 90 is coupled to the output shift registers of focus detectors 74 and 76, and comprises positive and negative peak detectors 91, 92, differential amplifiers 93, low pass filters 94 and differential amplifier 95. Positive and negative peak detectors 91 and 92 are coupled to each of focus detectors 74 and 76 and select the maxima and minima of the focus detector output waveforms, thus corresponding to the track and between-track portions of the optical disk.

Differential amplifiers 93 compute the difference between the maxima and minima selected by peak detectors 91 and 92 for each focus detector, and provide that difference to low pass filters 94. Low pass filters 94 serve as integrators, and have a passband width compatible with the operating bandwidth of servo-motor 80. The difference between the outputs of integrating low pass filters 94 is then computed by differential amplifier 95, and the resulting focus error signal is provided to servo-motor 80.

When objective 64 is at a correct focussing position, the light beams directed by micro-lenses 70 and 72 to focus detectors 74 and 76 will be balanced so that the difference of the outputs of focus detectors 74 and 76 will be zero (i.e., the output waveforms 82 and 84 in FIG. 5 will be equal, so that the resulting focus error signal is zero).

Figure 8:
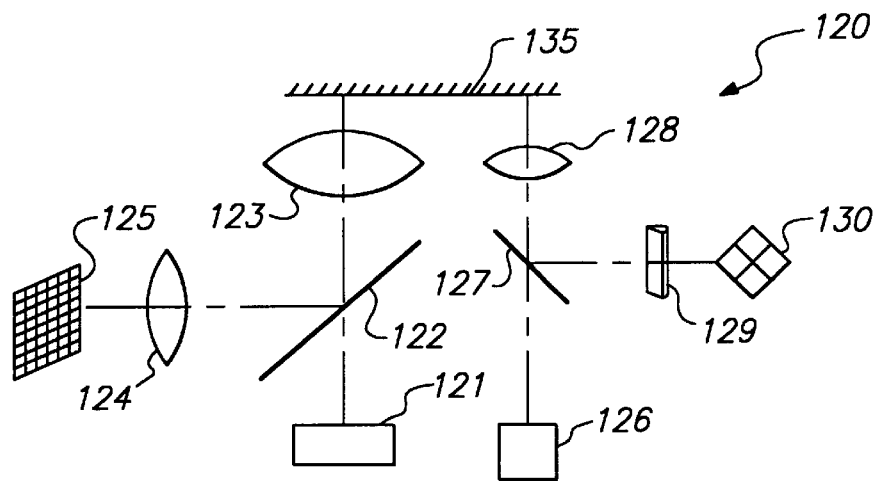
FIGS. 8 and 9 are illustrative diagrams, not to scale, of alternative focussing systems in accordance with the present invention.
Figure 9:
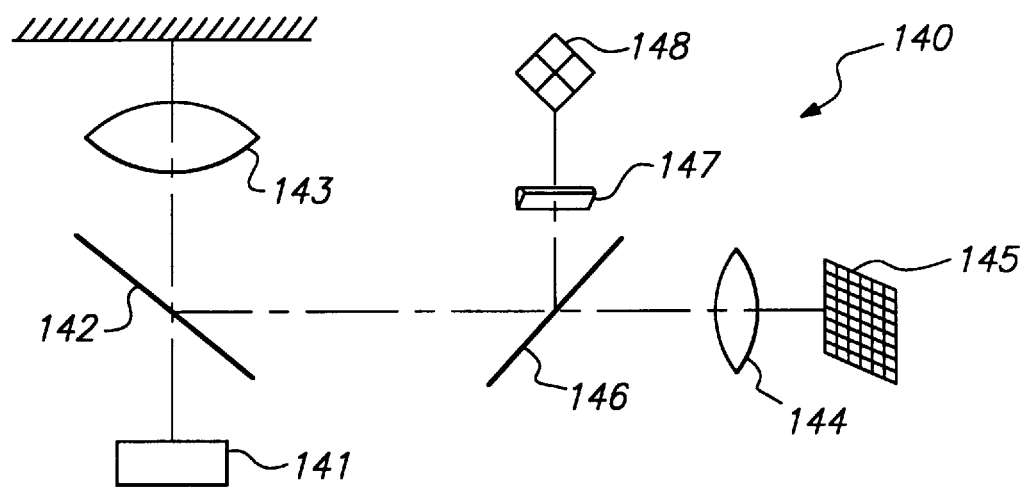

Referring now to FIGS. 8 and 9, further alternative embodiments of focussing systems suitable for use with apparatus capable of simultaneously reading multiple data tracks are described. While these embodiments are less preferred than those of FIGS. 3 and 5, focussing systems using the embodiments of FIGS. 8 and 9 may nevertheless be desirable for certain configurations of optical disk readers.

In FIG. 8, apparatus 120 comprises an imaging system comprising a wide-area illumination source 121, beam splitter 122, objective lens 123, tube lens 124, image detector 125 and a focussing system comprising narrow-beam light source 126, beam splitter 127, objective 128, cylindrical lens 129 and quadrant detector 130. In this embodiment, objective lenses 123 and 128 are mounted in a single pickup head which is driven by a single servo-motor (not shown).

Narrow-beam light source 126, which may be a semiconductor laser diode, provides an illumination beam only several microns wide. The light reflected from optical disk 135 passes through cylindrical lens 129 and impinges upon quadrant detector 130. Quadrant detector 130 then generates a focus error signal, as described hereinabove, which may be used to drive the servo-motor controlling positioning of the pickup head. Thus, when objective lens 128 is in focus, objective lens 123 will also be in focus.

Referring now to FIG. 9, apparatus 140 is described. Multi-track reading and focussing system 140 includes wide-area illumination source 141, beam splitter 142, objective lens 143, tube lens 144 and image detector 145. Interposed between beam splitter 142 and tube lens 144 is an auxiliary beam splitter 146 that diverts part of the light emanating from objective lens 143 to cylindrical lens 148. Light passing through lens 148 is directed to quadrant detector 148. Additional tube lenses, not shown, may be interposed between beam splitter 146 and cylindrical lens 147 to concentrate the wide-area illumination image to a size suitable for use with quadrant detector 148.

The embodiment of FIG. 9 therefore diverts a portion of the light beam directed to image detector 145 to quadrant detector 148 using beam splitter 146. A focus error signal that drives a servo-motor moving objective lens 143 is generated by quadrant detector in accordance with the astigmatism method described hereinabove.

The above-described embodiments of FIGS. 8 and 9 impose some additional cost relative to, for example, the embodiment of FIG. 3, by requiring additional optical elements and alignment of the optical axes of these components. In addition, the embodiment of FIG. 8 requires an additional laser diode, while in the embodiment of FIG. 9 the use of an additional beam splitter may reduce optical efficiency. Nevertheless, these embodiments offer certain cost advantages relating to the use of previously known optical and electronic devices, and may prove beneficial for certain configurations of optical disk readers.

It will of course be understood by those skilled in the relevant arts that the exemplary embodiments of the invention described hereinabove in no way limit the intended use of the methods and apparatus of the present invention, and that the methods of the present invention could be implemented using focussing systems having other configurations.

While preferred illustrative embodiments of the present invention are described above, it will be obvious to one skilled in the art that various changes and modifications may be made therein without departing from the invention and it is intended in the appended claims to cover all such changes and modifications which fall within the true spirit and scope of the invention.

What is claimed is:

1. A method of correcting the focus in apparatus for simultaneously reading multiple tracks of an optical disk, the apparatus including a light source providing a wide-area field of illumination that covers multiple tracks, an image detector, an objective, and a servo-system that moves the objective, the method comprising steps of:

providing a lens having first and second micro-lenses of different focal lengths;

providing first and second focus detectors generating outputs;

positioning the first and second focus detectors adjacent to the image detector;

positioning the lens within a light beam reflected from the optical disk corresponding to the wide-area field of illumination so that light passing through the first micro-lens is directed to the first focus detector and light passing through the second micro-lens is directed to the second focus detector, the first micro-lens having a focal length shorter than a distance between the first micro-lens and the first focus detector, the second micro-lens having a focal length longer than a distance between the second micro-lens and the second focus detector; and computing an error signal from the outputs of the first and second focus detectors to drive the servo-system responsive to a distortion of the light beam reflected from the optical disk.

2. The method as defined in claim 1 wherein the first and second focus detectors output signals corresponding to modulations of the light beam reflected from the optical disk, the step of computing an error signal comprising computing a difference of the signals output by the first and second focus detectors.

3. The method as defined in claim 2, wherein the modulations of the light beam reflected from the optical disk create modulations in the signals output by the first and second focus detectors, the step of computing an error signal further comprising equilibrating the amplitudes of the modulations in the signals output by the first and second focus detectors.

4. In apparatus for simultaneously reading multiple tracks of an optical disk, the apparatus including a light source providing a wide-area field of illumination that covers multiple tracks, an image detector, an objective, and a servo-system that moves the objective, an improvement comprising a focussing system including:

first and second focus detectors adjacent to the image detector, the first and second focus detectors generating outputs;

a lens having first and second micro-lenses of different focal lengths, the lens positioned within a light beam reflected from the optical disk that corresponds to the wide-area field of illumination, light passing through the first micro-lens directed to the first focus detector and light passing through the second micro-lens is directed to the second focus detector, the first micro-lens having a focal length shorter than a distance between the first micro-lens and the first focus detector, the second micro-lens having a focal length longer than a distance between the second micro-lens and the second focus detector; and means for computing an error signal from the outputs of the first and second focus detectors to drive the servo-system responsive to a distortion of a light beam reflected from the optical disk.

5. The apparatus as defined in claim 4 wherein the first and second focus detectors output signals corresponding to modulations of the light beam reflected from the optical disk, the means for computing an error signal comprising computing a difference of the signals output by the first and second focus detectors.

6. The apparatus as defined in claim 5, wherein the modulations of the light beam reflected from the optical disk create modulations in the signals output by the first and second focus detectors, the error signal tending toward zero as the modulations in the signals output by the first and second focus detectors reach equal amplitudes.

7. The apparatus as defined in claim 6 wherein the means for computing comprises, coupled to each of the first and second focus detectors, a positive peak detector, a negative peak detector and a differential amplifier, the positive and negative peak detectors coupled to each one of the first and second focus detectors, an output of each of the positive peak detector and negative peak detector coupled to the differential amplifier.

8. The apparatus of claim 7 wherein the means for computing an error signal further comprises first and second low pass filters having passbands compatible with the servo-system.

9. The apparatus as defined in claim 5 wherein the means for computing comprises a differential amplifier coupled to the first and second focus detectors.

10. Apparatus for simultaneously reading multiple tracks of an optical disk comprising:

a light source providing a wide-area field of illumination that covers multiple tracks of the optical disk, an image detector, an objective, a servo-system that moves the objective to correct an out-of focus condition;

first and second focus detectors adjacent to the image detector, the first and second focus detectors generating outputs;

a lens having first and second micro-lenses of different focal lengths, the lens positioned within a light beam reflected from the optical disk that corresponds to the wide-area field of illumination, light passing through the first micro-lens directed to the first focus detector and light passing through the second micro-lens is directed to the second focus detector, the first micro-lens having a focal length shorter than a distance between the first micro-lens and the first focus detector, the second micro-lens having a focal length longer than a distance between the second micro-lens and the second focus detector; and means for computing an error signal from the outputs of the first and second focus detectors to drive the servo-system responsive to a distortion of a light beam reflected from the optical disk.

11. The apparatus as defined in claim 10 wherein the first and second focus detectors output signals corresponding to modulations of the light beam reflected from the optical disk, the means for computing an error signal comprising computing a difference of the signals output by the first and second focus detectors.

12. The apparatus as defined in claim 11, wherein the modulations of the light beam reflected from the optical disk create modulations in the signals output by the first and second focus detectors, the error signal tending toward zero as the modulations in the signals output by the first and second focus detectors reach equal amplitudes.

13. The apparatus as defined in claim 11 wherein the means for computing comprises a differential amplifier coupled to the first and second focus detectors.

14. The apparatus of claim 13 wherein the means for computing an error signal further comprises first and second low pass filters having passbands compatible with the servo-system.

15. The apparatus as defined in claim 10 wherein the means for computing comprises, coupled to each of the first and second focus detectors, a positive peak detector, a negative peak detector and a differential amplifier, the positive and negative peak detectors coupled to each one of the first and second focus detectors, an output of each of the positive peak detector and negative peak detector coupled to the differential amplifier.

* * * * *